(12) United States Patent
Li (10) Patent No.: US 7,780,332 B2
(45) Date of Patent: Aug. 24, 2010

(54) HOLDING FRAME AND BACKLIGHT MODULE WITH THE SAME

(75) Inventor: Wen-Tao Li, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 34 days.

(21) Appl. No.: 12/002,426

(22) Filed: Dec. 17, 2007

(65) Prior Publication Data

US 2008/0144337 A1    Jun. 19, 2008

(30) Foreign Application Priority Data

Dec. 15, 2006    (TW)    ............... 95147252 A (51) Int. Cl.
F21V 7/18    (2006.01)
(52) U.S. Cl. ...................... 362/632; 362/633
(58) Field of Classification Search ......... 362/632–634; 349/58, 62, 63, 65, 67
See application file for complete search history.

(56) References Cited

U.S. PATENT DOCUMENTS

| 6,715,896 B2 * | 4/2004 | Kawashima et al. | ........ 362/613 |
| 6,976,781 B2 | 12/2005 | Chu et al. | |
| 7,134,780 B2 * | 11/2006 | Tsai | ............... 362/633 |
| 2005/0122739 A1 | 6/2005 | Huang et al. | |

FOREIGN PATENT DOCUMENTS

| CN | 1493900 A | 5/2004 |
| CN | 1837929 A | 9/2006 |
| TW | I226494 B | 1/2005 |
| TW | M291486 Y | 6/2006 |

* cited by examiner

*Primary Examiner*—Thomas M Sember
(74) *Attorney, Agent, or Firm*—Wei Te Chung (57) ABSTRACT

An exemplary backlight module (1) includes a light guide plate (3) including two light incident surfaces (31), two light sources (4) provided adjacent to the light incident surfaces of the light guide plate, and a holding frame (5). The holding frame includes two sliding frames (52) and a bottom plate (51). Each sliding frame includes two side walls opposite to each other and a connecting wall perpendicularly connected with the side walls. The sliding frame defines a sliding structure. The bottom plate is slidingly received in the sliding structures of the sliding frames. The bottom plate and the sliding frame cooperatively form a space to accommodate the light guide plate and the light source therein.

18 Claims, 10 Drawing Sheets

HOLDING FRAME AND BACKLIGHT MODULE WITH THE SAME

CROSS-REFERENCE TO RELATED APPLICATION

This application is related to, and claims the benefit of, a foreign priority application filed in Taiwan as Serial No. 95147252 on Dec. 15, 2006. The related application is incorporated herein by reference.

FIELD OF THE INVENTION

The present invention relates to holding frames used in backlight modules of liquid crystal displays (LCDs), and particularly to a holding frame having sliding structures and a backlight module including the holding frame.

GENERAL BACKGROUND

Liquid crystal displays are commonly used as displays for compact electronic apparatuses. This is because they not only provide good quality images with little power consumption but also because they are very thin. The liquid crystal layer in a liquid crystal display does not emit any light beams itself. The liquid crystal has to be lit by a light source so as to clearly and sharply display text and images. Thus, a backlight module is generally needed for a liquid crystal display.

Figure 10:
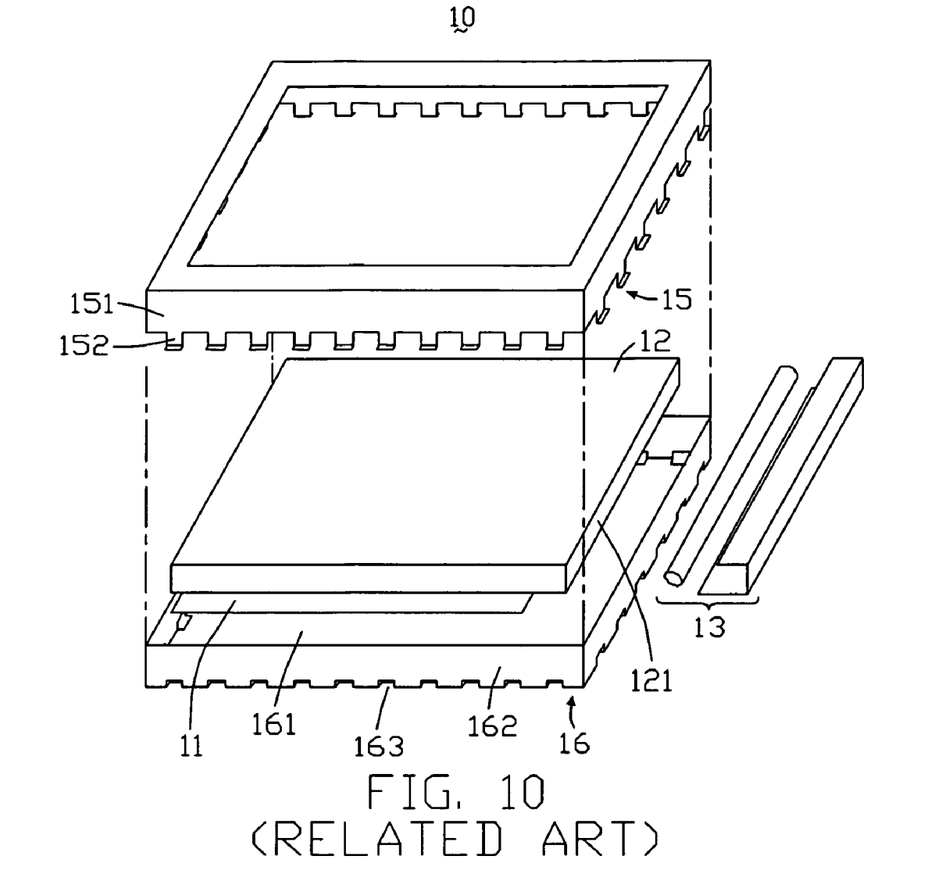
FIG. 10 is an exploded, isometric view of a conventional backlight module.

Referring to FIG. 10, a typical backlight module 10 includes a reflective film 11, a light guide plate 12, a light source 13, and a holding frame (not labeled). The light guide plate 12 includes a light incident surface 121, and a bottom surface (not labeled) perpendicularly adjoining the light incident surface 121. The light source 13 is disposed adjacent to the light incident surface 121, and the reflective film 11 is disposed adjacent to the bottom surface of the light guide plate 12. The holding frame includes a plastic frame 15 and a tray 16, which cooperatively form a space to accommodate the reflective film 11, the light guide plate 12 and the light source 13.

The plastic frame 15 includes a plurality of first side walls 151. A bottom edge of each first side wall 151 includes a plurality of protrusions 152 extending downwardly and then outwardly therefrom. The tray 16 includes a bottom plate 161, and a plurality of second side walls 162 perpendicularly extending up from edges of the bottom plate 161. The tray 16 further defines a plurality of notches 163 at junctions between the bottom plate 161 and the second side walls 162. The notches 163 correspond to the protrusions 152, respectively.

Figure 11:
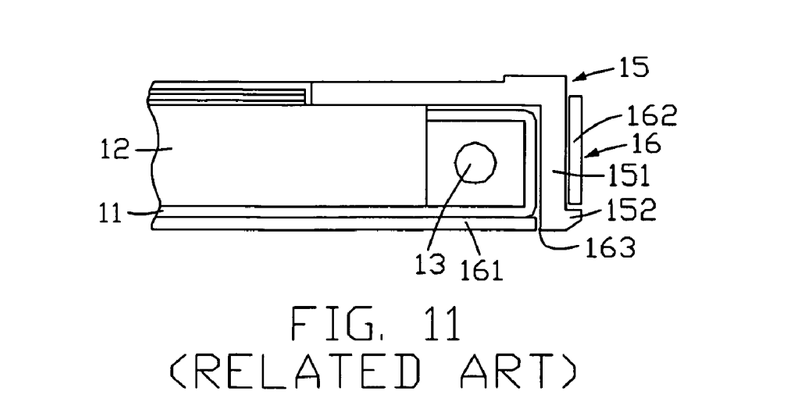
FIG. 11 is an enlarged, side cross-sectional view of part of the backlight module of FIG. 10 after the backlight module has been assembled.

Referring also to FIG. 11, in a process of assembling the backlight module 10, the reflective film 11, the light guide plate 12 and the light source 13 are arranged in the tray 16. Then the plastic frame 15 is aligned with the tray 16 and pushed toward the tray 16. The first side walls 151 of the plastic frame 15 slide along inner surfaces of the second side walls 162 of the tray 16. When the bottom edges of the first side walls 151 reach the edges of the tray 161 of the bottom plate 16, the protrusions 152 are snappingly received in the notches 163 of the tray 16. Thus, the plastic frame 15 is engaged with the tray 16, and the backlight module 10 is fully assembled.

However, in the process of assembling the backlight module 10, the protrusions 152 of the plastic frame 15 are elastically deformed while the first side walls 151 of the plastic frame 15 slide along the inner surfaces of the second side walls 162 of the tray 16. Once the protrusions 152 reach the notches 163, the plastic frame 15 generally has to be manually pressed so that all the protrusions 152 can snappingly engage in the notches 163. Considerable force may be required during such pressing. Therefore, the plastic frame 15 may be distorted or even be damaged. When this occurs, the mechanical stability and the performance of the backlight module 10 are liable to be impaired. Furthermore, a process of disassembling the backlight module 10 can be awkward and difficult.

What is needed, therefore, is a holding frame that can overcome the above-described deficiencies. What is also needed is a backlight module including the holding frame.

SUMMARY

In one preferred embodiment, a backlight module includes a light guide plate including at least one light incident surface, at least one light source provided adjacent to the at least one light incident surface of the light guide plate and a holding frame. The holding frame includes a pair of sliding frames and a bezel. Each sliding frame includes two side walls opposite to each other and a connecting wall perpendicularly connected with the side walls. Each sliding frame defines a sliding structure. The bottom plate is slidingly received in the sliding structures of the sliding frames. The bottom plate and the sliding frame cooperatively form a space to accommodate the light guide plate and the light source therein.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
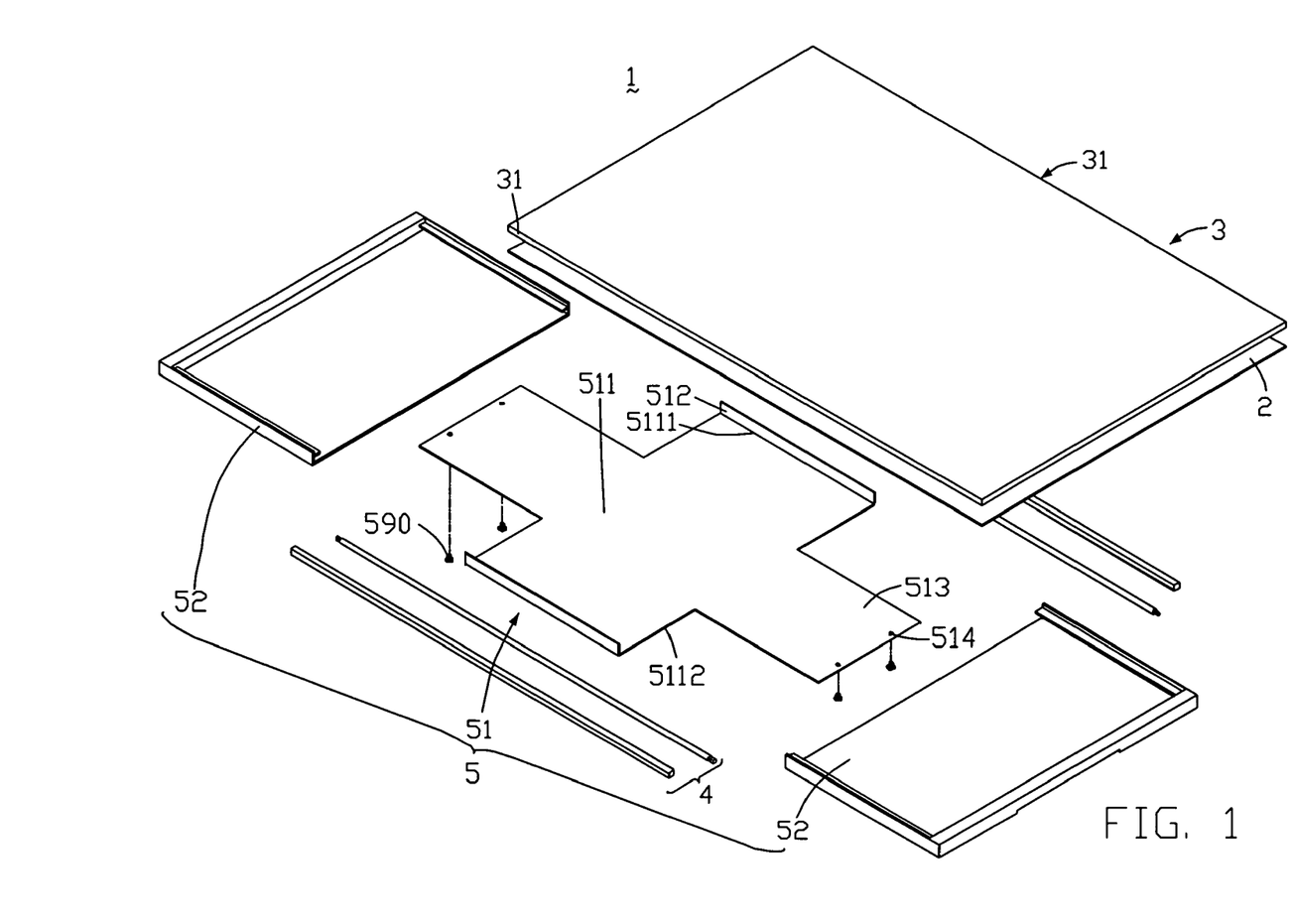
FIG. 1 is an exploded, isometric view of a backlight module according to a first embodiment of the present invention, the backlight module including a holding frame, the holding frame including two sliding frames.

Referring to FIG. 1, a backlight module 1 according to a first embodiment of the present invention includes a reflective film 2, a light guide plate 3, two light sources 4, and a holding frame 5. The light guide plate 3 includes two light incident surfaces 31 at opposite sides thereof, and a bottom surface (not labeled) perpendicularly adjoining the light incident surfaces 31. The light sources 4 are disposed adjacent to the two light incident surfaces 31 of the light guide plate 3, respectively, and the reflective film 2 is disposed adjacent to the bottom surface of the light guide plate 3. The holding frame 5 includes a bottom plate 51 and two sliding frames 52, which cooperatively form a space to accommodate the reflective film 2, the light guide plate 3 and the light sources 4.

The bottom plate 51 includes a rectangular base plate 511 having two opposite first edges 5111 and two opposite second edges 5112, two first expanding plates 512 extending upwardly from the first edges 5111, and two second expanding plates 513 extending horizontally outward from middle portions of the second edges 5112, respectively. A width of each second expanding plate 512 is less than a width of the base plate 511 between the first edges 5111. Each second expanding plate 513 defines two first screw holes 514 at a free end thereof.

Figure 2:
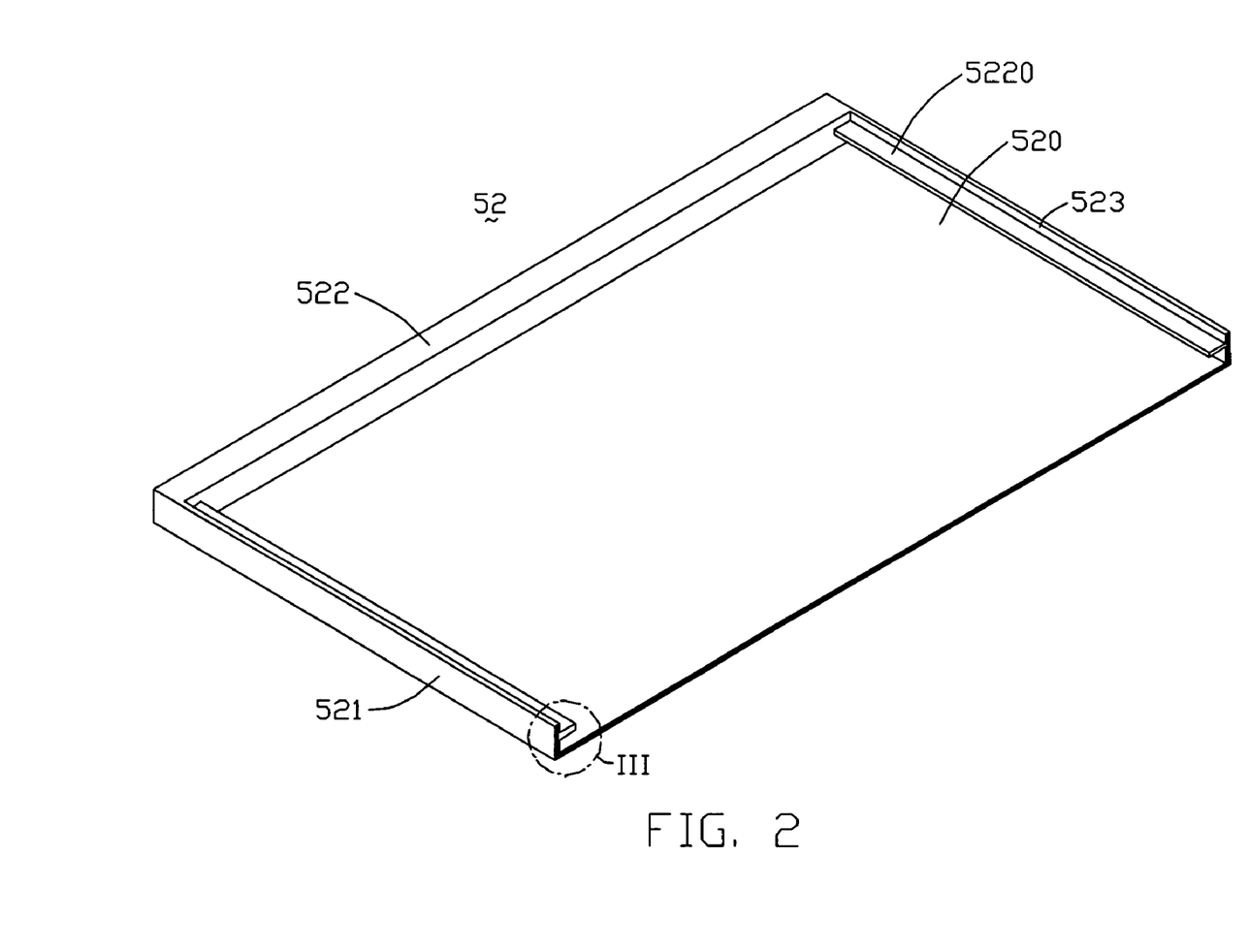
FIG. 2 is an enlarged, isometric view of one of the sliding frames of the holding frame of FIG. 1.
Figure 3:
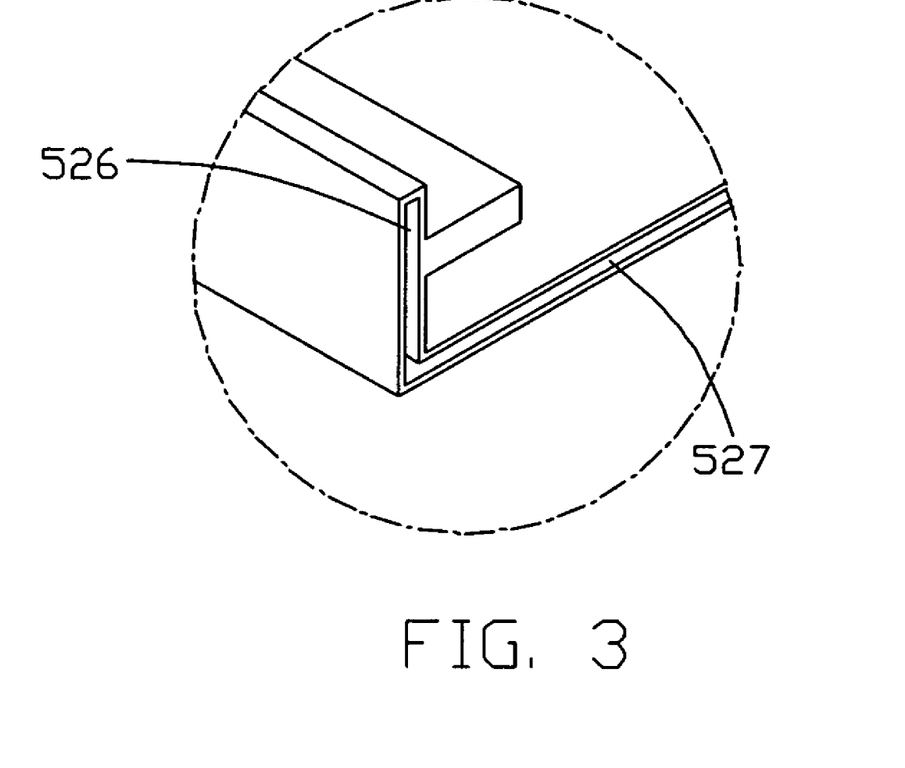
FIG. 3 is an enlarged view of a circled portion III of FIG. 2.

Referring also to FIG. 2 and FIG. 3, each sliding frame 52 includes a bottom plate 520, a first side wall 521, a second side wall 522, and a third side wall 523. The first side wall 521, the second side wall 522 and the third side wall 523 extend upwardly from three edges of the bottom plate 520. The first side wall 521 faces the third side wall 523. The second side wall 522 is perpendicularly connected with the first side wall 521 and the third side wall 523. Each of the first side wall 521 and the third side wall 523 includes a spacing plate 5220 extending from a middle portion of an inner surface thereof. The spacing plates 5220 are parallel to the bottom plate 520.

Each of the first side wall 521 and the third side wall 523 defines a first sliding guide 526 therein, the first sliding guides 526 corresponding to the first expanding plates 512 of the bottom plate 51. The bottom plate 520 defines a second sliding guide 527 therein, corresponding to one of the second expanding plates 513 of the bottom plate 51. The second sliding guide 527 communicates with the first sliding guides 526. Thus, the first side wall 521, the third side wall 523 and the bottom plate 520 cooperatively define a generally U-shaped groove therein. A width of each first sliding guides 526 is substantially equal to or a little greater than a thickness of each first expanding plate 512 of the bottom plate 51. A width of the second sliding guide 527 is substantially equal to or a little greater than a thickness of each second expanding plate 513 of the bottom plate 51.

Figure 4:
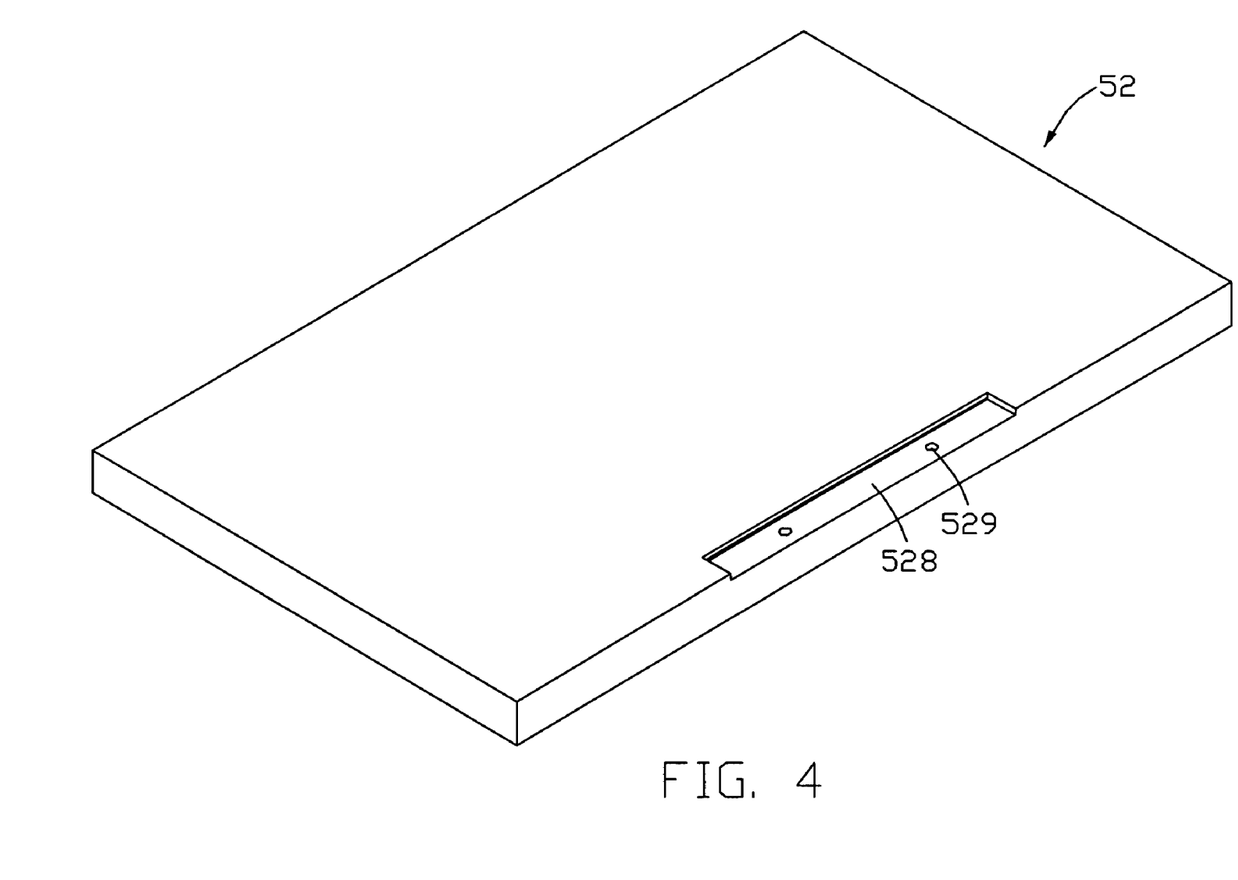
FIG. 4 is an inverted, isometric view of the sliding frame of FIG. 2.

Referring also to FIG. 4, the bottom plate 520 of each sliding frame 52 defines a recess 528 at a bottom surface (not labeled) thereof, adjacent to the second side wall 522. The recess 528 corresponds to the free end of one of the second expanding plates 513 of the bottom plate 51. The recess 528 communicates with the second sliding guide 527. Thus, the free end of the second expanding plate 513 can be received in the recess 528. A length of the recess 528 is substantially equal to the width of the second expanding plate 513. The bottom plate 520 further defines two second screw holes 529 at the recess 528, the second screw holes 529 corresponding to the first screw holes 514 of the second expanding plate 513.

Figure 5:
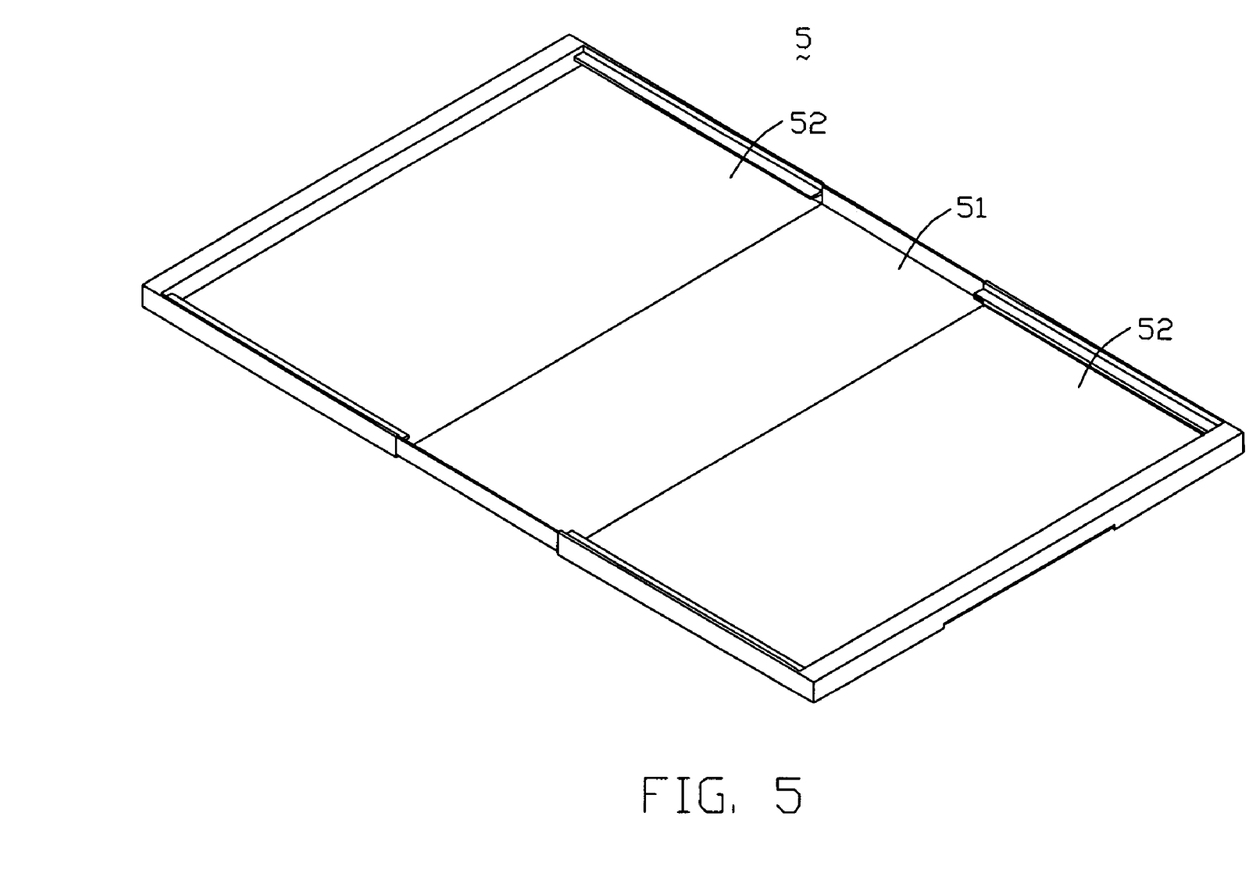
FIG. 5 is an assembled view of the holding frame of FIG. 1.

Referring also to FIG. 5, the bottom plate 51 and each of the sliding frames 52 are assembled as follows. First, the bottom plate 51 is aligned with the groove of the sliding frame 52. Then, the bottom plate 51 is inserted into the sliding frame 52. One of the second expanding plates 513 of the bottom plate 51 slides along the second sliding guide 527, and the first expanding plates 512 of the bottom plate 51 slide along the first sliding guides 526. When the free end of the second expanding plate 513 is fully received in the recess 528, the first screw holes 514 of the bottom plate 51 are aligned with the second screw holes 529 of the sliding frame 52. Two screws 590 are screwed into the first screw holes 514 and the second screw holes 529, thereby fixing the bottom plate 51 with the sliding frame 52. Then the light sources 4, the reflective film 2 and the light guide plate 3 are inserted into a space formed by the bottom plate 51 and the sliding frame 52. In particular, each of the light sources 4 is received between one of the spacing plates 5220 and the bottom plate 520. Then the other sliding frame 52 is fixed with the bottom plate 51 in much the same way as described above, such that ends of the light sources 4, the reflective film 2 and the light guide plate 3 are received in a space formed by the bottom plate 51 and the other sliding frame 52. Thus, the backlight module 1 is fully assembled.

Unlike with conventional backlight modules, the holding frame 5 of the backlight module 1 includes the bottom plate 51 and the two sliding frames 52. Each sliding frame 52 defines the two first sliding guides 526 and the second sliding guide 527. The first sliding guides 526 and the second sliding guide 527 cooperatively define the groove in the sliding frame 52, such that the bottom plate 51 is inserted into the sliding frame 52 by sliding motion. Thereby, distortion of the sliding frames 52 and the bottom plate 51 can be avoided. The holding frame 5 can be conveniently and safely assembled or disassembled, and therefore the mechanical stability and the performance of the holding frame 5 are improved. Correspondingly, the mechanical stability and performance of the backlight module 1 are also improved.

Figure 6:
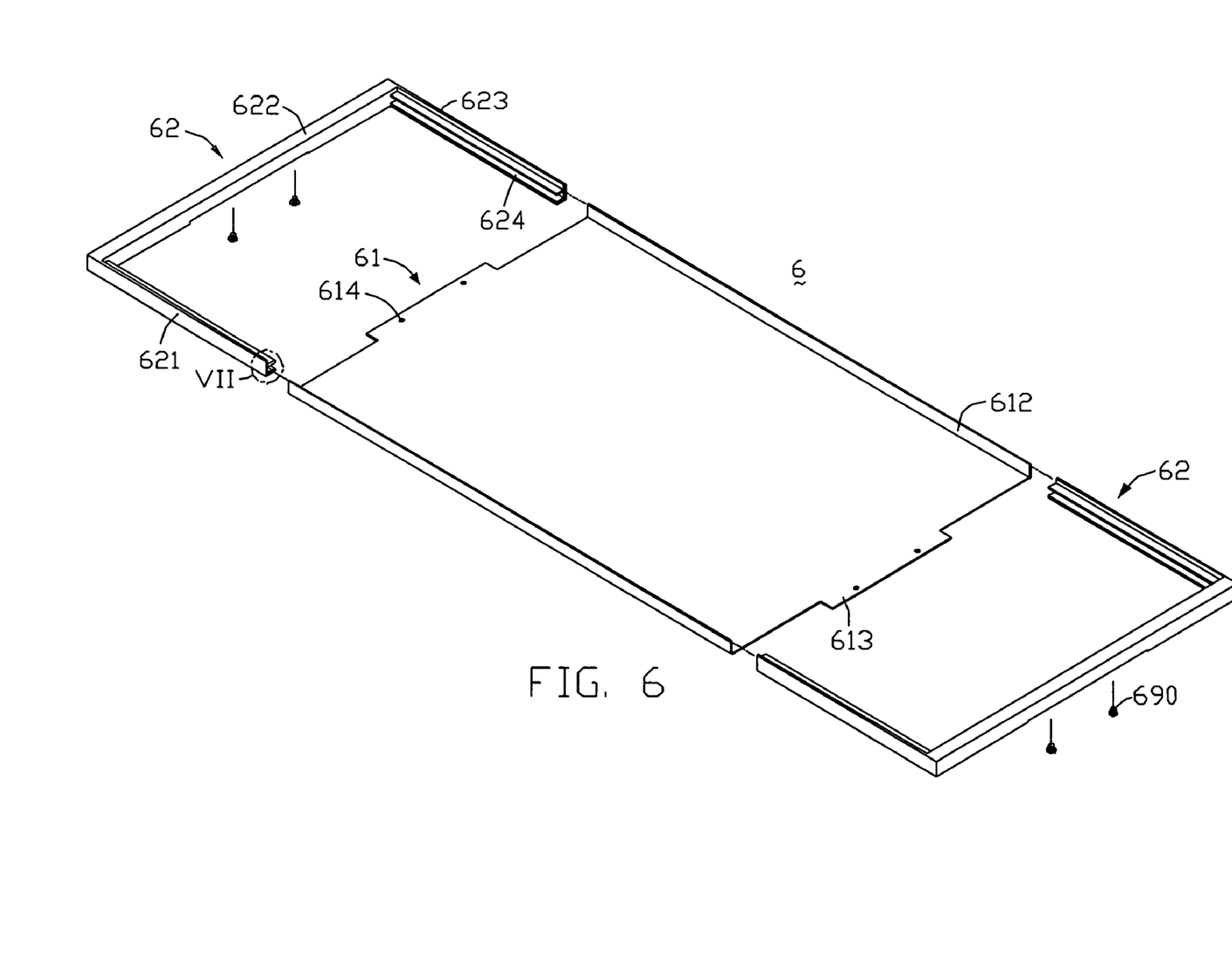
FIG. 6 is an exploded, isometric view of a holding frame for a backlight module according to a second embodiment of the present invention.
Figure 7:
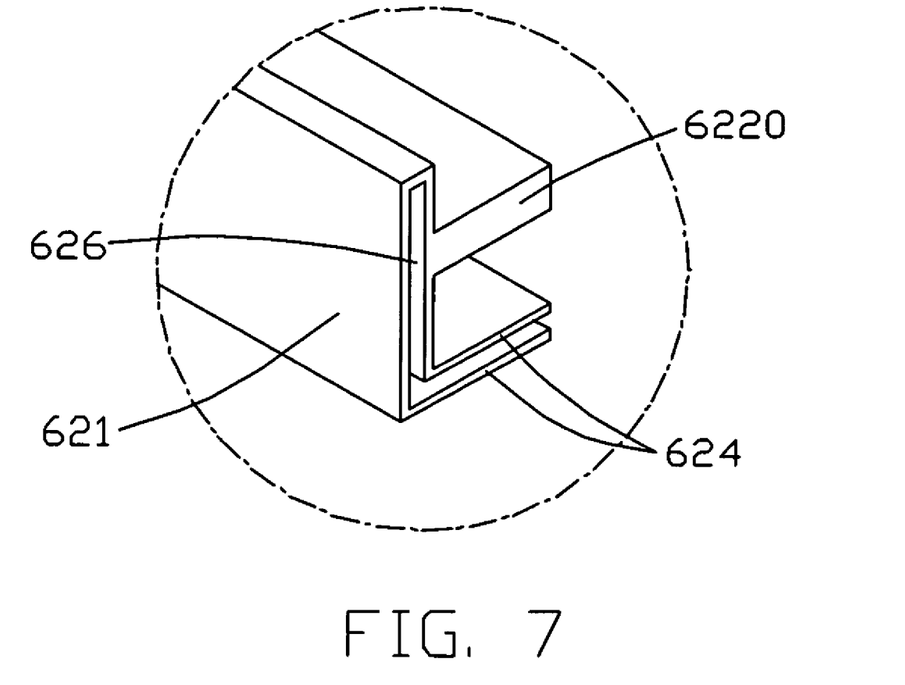
FIG. 7 is an enlarged view of a circled portion VII of FIG. 6.

Referring to FIG. 6 and FIG. 7, a backlight module 6 according to a second embodiment of the present invention is similar in principle to the holding frame 5. However, each of sliding frames 62 includes a first side wall 621, a second side wall 622, and a third side wall 623. The first side wall 621 faces the third side wall 623. The second side wall 622 is perpendicularly connected with the first side wall 621 and the third side wall 623. Each of the first side wall 621 and the third side wall 623 includes a spacing plate 6220 extending horizontally inward from a middle portion of an inner surface thereof, and a protrusive plate 624 extending horizontally inward from a bottom edge thereof. Each of the first side walls 621 and the third side wall 623 defines a generally L-shaped groove, which serves as a sliding guide 626 for the bottom plate 61.

In a process of assembly of the backlight module 6, a bottom plate 61 is aligned with the sliding guides 626 of one of the sliding frames 62. Then, the bottom plate 61 is inserted into the sliding guides 626 of the sliding frame 62. In particular, two first expanding plates 612 and one second expanding plate 613 of the bottom plate 61 slide along the sliding guides 626. Two first screw holes 614 of the bottom plate 61 reach locations in alignment with two second screw holes (not shown) of the sliding frame 62. Two screws 690 are screwed into the first screw holes 614 and the second screw holes. Thus the bottom plate 61 is engaged with the sliding frame 62. Then a reflective film (not shown), a light guide plate (not shown), and two light sources (not shown) are inserting into a space formed by the sliding frame 62 and the bottom plate 61. Then the other sliding frame 62 is fixed with the bottom plate 61 in much the same way as described above, such that ends of the reflective film, the light guide plate and the light sources are received in a space formed by the bottom plate 61 and the other sliding frame 62. Thus, the backlight module 6 and the corresponding backlight module are fully assembled.

Figure 8:
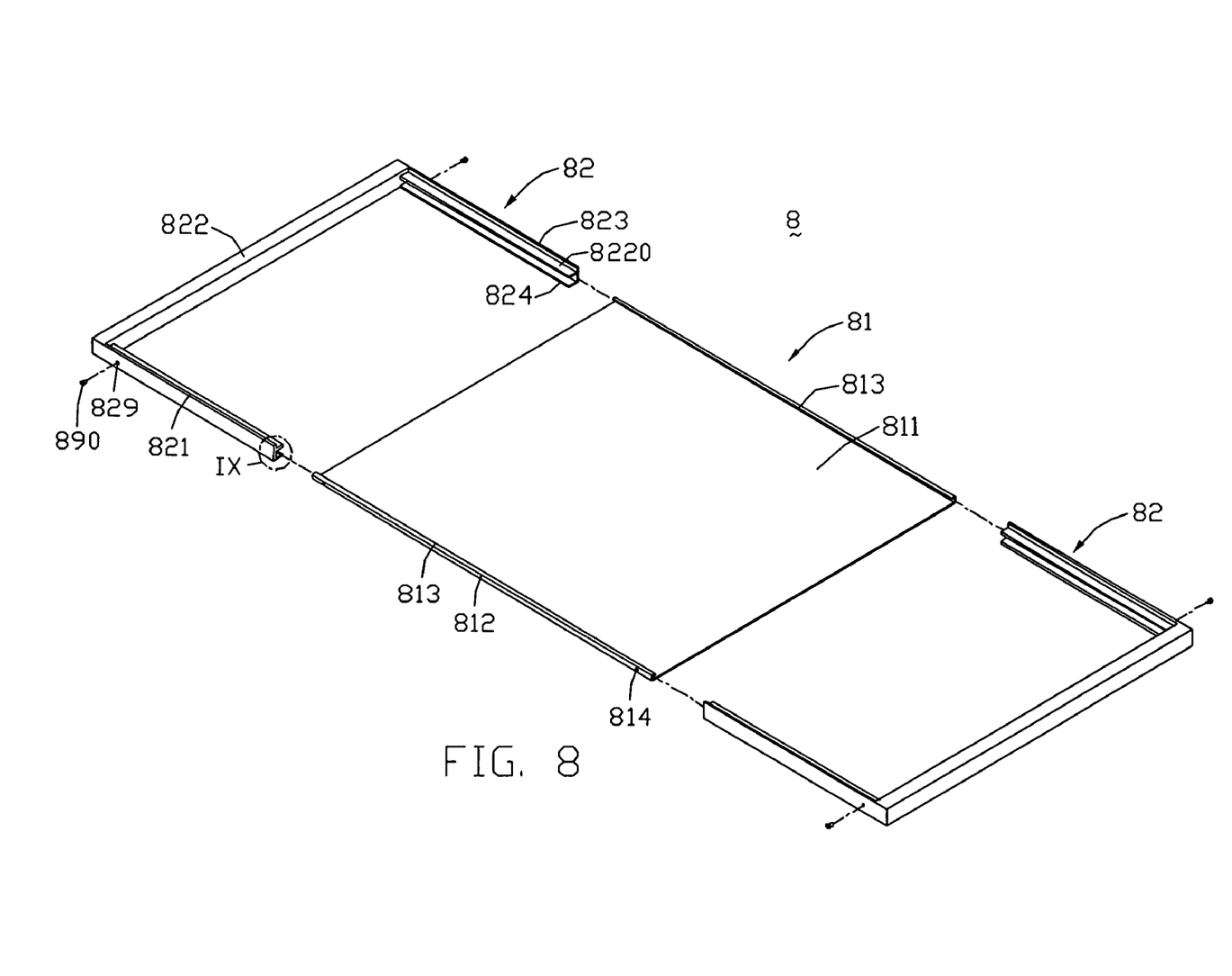
FIG. 8 is an exploded, isometric view of a holding frame for a backlight module according to a third embodiment of the present invention.
Figure 9:
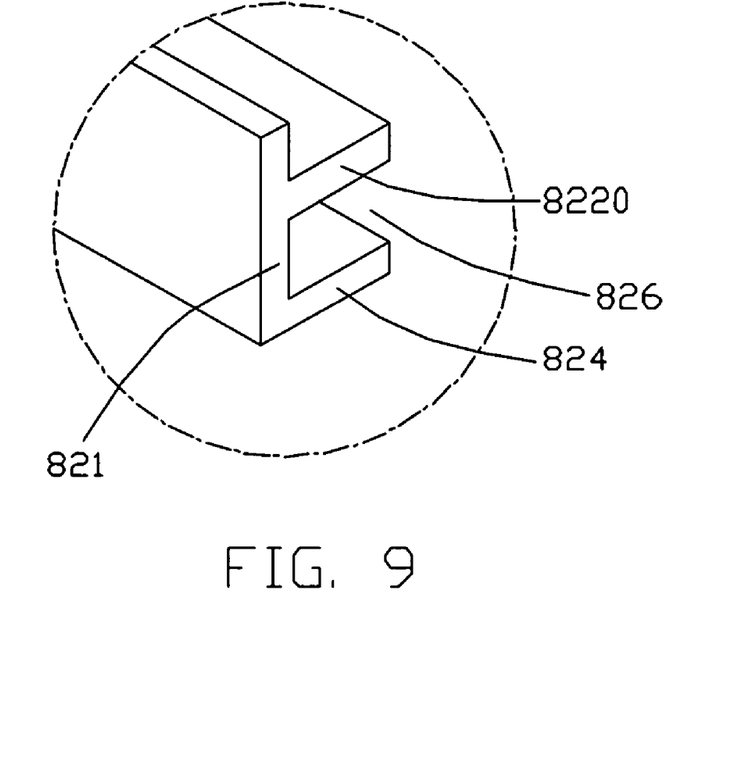
FIG. 9 is an enlarged view of a circled portion IX of FIG. 8.

Referring to FIG. 8 and FIG. 9, a backlight module 8 according to a third embodiment of the present invention is similar in principle to the holding frame 5. However, a bottom plate 81 includes a base plate 811, and two expanding plates 812 extending upwardly from two opposite edges of the base plate 811 respectively. Each expanding plates 812 includes an extending plate portion 813 extending horizontally inward from a top end of a main body thereof. The extending plate portions 813 are parallel to the base plate 811. Each of the expanding plates 812 defines two first screw holes 814 at two ends thereof, respectively.

Each sliding frame 82 includes a first side wall 821, a second side wall 822, and a third side wall 823. Each of the first side wall 821 and the third side wall 823 includes a spacing plate 8220 extending perpendicularly inward from a middle portion of an inner surface thereof, and a protrusive plate 824 extending perpendicularly inward from a bottom end thereof. The spacing plate 8220 and the protrusive plate 824 are parallel to each other, and form a sliding guide 826 corresponding to one of the expanding plates 812 of the bottom plate 81. Each of the first side wall 821 and the third side wall 823 defines a second screw hole 829, corresponding to one of the first screw holes 814 of the respective expanding plate 812.

In a process of assembly of the backlight module 8, the bottom plate 81 is inserted into one of the sliding frames 82. The expanding plates 812 slide along the sliding guides 826, respectively. When an end of the bottom plate 81 contacts an inner surface of the second side wall 822, the first screw holes 814 reach locations in alignment with the two corresponding second screw holes 829. Two screws 890 are screwed into the first screw holes 814 and the second screw holes 829. Outer surfaces of the expanding plates 812 abut corresponding inner surfaces of the sliding guides 826. Thus the bottom plate 81 is engaged with the sliding frame 82. Then a reflective film (not shown), a light guide plate (not shown), and light sources (not shown) are inserting into a space formed by the sliding frame 82 and the bottom plate 81. Then the other sliding frame 82 is fixed with the bottom plate 81 in much the same way as described above, such that ends of the reflective film, the light guide plate and the light sources are received in a space formed by the bottom plate 81 and the other sliding frame 82. Thus, the backlight module 8 and the corresponding backlight module are fully assembled.

It is to be further understood that even though numerous characteristics and advantages of various embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module comprising:
   a light guide plate comprising at least one light incident surface,
   at least one light source provided adjacent to the at least one light incident surface of the light guide plate, and
   a holding frame comprising a pair of sliding frames and a bottom plate engaged with the sliding frames, each of the sliding frames comprising two side walls opposite to each other, a connecting wall perpendicularly connected with the side walls, and a bottom portion extending from bottom ends of the side walls, each sliding frame defining a sliding structure, the bottom plate slidingly received in the sliding structures of the sliding frames, and the bottom plate and the sliding frames cooperatively forming a space accommodating the light guide plate and the at least one light source therein.

2. The backlight module as claimed in claim 1, wherein the bottom plate comprises a base plate and two first expanding plates extending upwardly from two opposite edges of the base plate, the two first expanding plates facing each other.

3. The backlight module as claimed in claim 2, wherein each sliding structure is two first sliding guides defined by the side walls.

4. The backlight module as claimed in claim 3, wherein a width of each first sliding guide is substantially equal to or a little greater than a thickness of each first expanding plate of the bottom plate.

5. The backlight module as claimed in claim 2, wherein the bottom portion comprises a bottom board perpendicularly connected with the side walls and the connecting wall, and each sliding structure is a second sliding guide defined by the bottom plate of each sliding frame.

6. The backlight module as claimed in claim 5, wherein the bottom plate further comprises two second expanding plates horizontally extending from the other two opposite edges of the base plate.

7. The backlight module as claimed in claim 6, wherein a width of each second sliding guide is substantially equal to or a little greater than a thickness of each second expanding plate of the bottom plate.

8. The backlight module as claimed in claim 6, wherein a bottom surface of the bottom plate of each sliding frame defines a recess corresponding to a free end of each second expanding plate of the bottom plate, and a width of each recess being is substantially equal to or a little greater than a width of each second expanding plate.

9. The backlight module as claimed in claim 6, wherein free ends of the second expanding plates of the bottom plate define a plurality of first screw holes, and the bottom plate of each sliding frame defines a plurality of second screw holes corresponding to the first screw holes.

10. The backlight module as claimed in claim 9, further comprising a plurality of screws screwed in the first screw holes and the second screw holes for fixing the bottom plate with the sliding frame.

11. The backlight module as claimed in claim 2, wherein the bottom portion comprises two protrusive plates extending inward from bottom ends of the side walls thereof, respectively.

12. The backlight module as claimed in claim 11, wherein each sliding structure is two L-shaped sliding guides defined by the side walls and the protrusive plates, one side wall and one corresponding protrusive plate defining one L-shaped sliding guide.

13. The backlight module as claimed in claim 2, wherein each of the first expanding plates of the bottom plate comprises an extending plate portion extending inward from a free end thereof.

14. The backlight module as claimed in claim 13, wherein each sliding frame further comprises two spacing plates extending from middle portions of inner surfaces of the side walls, respectively, and the bottom portion comprises two protrusive plates extending from bottom ends of inner surfaces of the side walls.

15. The backlight module as claimed in claim 14, wherein the spacing plates, the protrusive plates and the side walls form two sliding guides for the first expanding plates of the bottom plate, respectively.

16. The backlight module as claimed in claim 15, wherein outer surfaces of the first expanding plates of the bottom plate abut inner surfaces of the sliding guides of the sliding frame.

17. A backlight module comprising:
- a light guide plate comprising at least one light incident surface,
- at least one light source provided adjacent to the at least one light incident surface of the light guide plate, and
- a holding frame comprising a pair of sliding frames each defining a sliding structure, and a bottom plate configured for being slidingly received in the sliding structures of the sliding frames, the holding frame thereby holding the light guide plate and the at least one light source therein,
- wherein each of the sliding frames comprises two opposite side walls, each of the side walls comprises an L-shaped structure having an L-shaped groove therein, and the L-shaped structures having the L-shaped grooves cooperatively form the sliding structure, and
- the bottom plate comprises a base plate and two first expanding plates perpendicularly extending from two edges of the base plate, the two first expanding plates facing each other and corresponding to the sliding structure of the sliding frame.

18. A holding frame for a backlight module, the holding frame comprising:
- a pair of sliding frames, each sliding frame comprising two side walls opposite to each other and a connecting wall perpendicularly connected with the side walls, each sliding frame defining a sliding structure, and
- a bottom plate slidingly received in the sliding structures of the sliding frames,
- wherein each of the two opposite side walls of each sliding frame comprises a main body and a protrusive plate and defines at least one groove, and the main body, the protrusive plate and the at least one groove of the two opposite side walls cooperatively form the sliding structure of each sliding frame.

* * * * *